US010686793B2

(12) United States Patent
Verma

(10) Patent No.: US 10,686,793 B2
(45) Date of Patent: Jun. 16, 2020

(54) INTEGRATED BIOMETRICS FOR APPLICATION SECURITY

(71) Applicant: CA, Inc., Islandia, NY (US)

(72) Inventor: Vineet Verma, Hyderabad (IN)

(73) Assignee: CA, Inc., Islandia, NY (US)

(*) Notice: Subject to any disclaimer, the term of this patent is extended or adjusted under 35 U.S.C. 154(b) by 231 days.

(21) Appl. No.: 15/610,514

(22) Filed: May 31, 2017

(65) Prior Publication Data
US 2018/0351956 A1 Dec. 6, 2018

(51) Int. Cl.
H04L 29/06 (2006.01)
H04W 12/06 (2009.01)
H04W 12/08 (2009.01)
H04W 12/00 (2009.01)

(52) U.S. Cl.
CPC ........ *H04L 63/102* (2013.01); *H04L 63/0861* (2013.01); *H04L 63/107* (2013.01); *H04W 12/00503* (2019.01); *H04W 12/06* (2013.01); *H04W 12/08* (2013.01)

(58) Field of Classification Search
CPC combination set(s) only.
See application file for complete search history.

(56) References Cited

U.S. PATENT DOCUMENTS 8,371,501 B1 * 2/2013 Hopkins .................. G06F 21/35
235/380
9,613,483 B2 * 4/2017 Giobbi .................... G06Q 20/12
2002/0089960 A1 * 7/2002 Shuster ................... H04M 3/02
370/338
2003/0204526 A1 * 10/2003 Salehi-Had ............. G06F 21/35
2005/0221842 A1 * 10/2005 Kaneko ................. H04W 60/04
455/456.6
2007/0259690 A1 * 11/2007 Julian ..................... H04L 67/24
455/557
2007/0295807 A1 * 12/2007 Antos ..................... G06Q 30/06
235/382
2008/0033637 A1 * 2/2008 Kuhlman ................ H04L 63/10
701/533
2008/0095409 A1 * 4/2008 McQuaide ........... G07C 9/00087
382/115
2012/0257797 A1 * 10/2012 Leyvand ............. G06K 9/00221
382/118

(Continued)

FOREIGN PATENT DOCUMENTS

WO WO-2004079499 A2 * 9/2004 ............. G06F 21/34

*Primary Examiner* — Eric W Shepperd
(74) *Attorney, Agent, or Firm* — Morgan, Lewis & Bockius LLP

(57) ABSTRACT

An attempt to authenticate to a system resource using a particular device and particular credentials is identified and an identity of a user associated with the particular credentials is determined. In association with the attempt to authenticate, a location associated with the particular device is determined and sensor data generated by a set of sensors deployed in an environment is accessed, at least some of the sensor data including biometric data. The sensor data is used to detect a location of the user, and a degree of proximity between the location associated with the particular device and the location of the user is determined. An authentication action is caused to be performed corresponding to the attempt to authenticate based on the degree of proximity.

20 Claims, 11 Drawing Sheets

(56) References Cited

U.S. PATENT DOCUMENTS

| | | | | |
|---|---|---|---|---|
| 2013/0005443 | A1* | 1/2013 | Kosta | G07F 17/3206 |
| | | | | 463/25 |
| 2013/0262311 | A1* | 10/2013 | Buhrmann | G06Q 20/40 |
| | | | | 705/44 |
| 2013/0324081 | A1* | 12/2013 | Gargi | H04M 1/67 |
| | | | | 455/411 |
| 2014/0123273 | A1* | 5/2014 | Matus | G06F 21/32 |
| | | | | 726/17 |
| 2014/0278629 | A1* | 9/2014 | Stephenson | G06Q 10/1091 |
| | | | | 705/7.13 |
| 2015/0286285 | A1* | 10/2015 | Pantelopoulos | A61B 5/6802 |
| | | | | 345/156 |
| 2016/0055692 | A1* | 2/2016 | Trani | G07O 9/00007 |
| | | | | 340/5.61 |
| 2016/0232531 | A1* | 8/2016 | Hefetz | G06Q 20/4014 |
| 2017/0242995 | A1* | 8/2017 | Bassenye-Mukasa | |
| | | | | G06F 16/24575 |
| 2017/0359769 | A1* | 12/2017 | Martono | H04W 4/029 |
| 2018/0062851 | A1* | 3/2018 | Cronholm | H04L 9/3247 |
| 2018/0192292 | A1* | 7/2018 | Coney | H04W 12/08 |
| 2019/0121950 | A1* | 4/2019 | Gupta | H04L 63/107 |

* cited by examiner

| ICON | ENTITY | DESCRIPTION |
|---|---|---|
|  405 | SECURE SYSTEM | TARGET SYSTEM, WHICH NEEDS TO BE SECURED |
|  410 | AUTHENTICATED USER | A LEGAL USER REGISTERED TO THE SYSTEM |
|  415 | CULPRIT | PERSON WHO MAY HAVE ACQUIRED THE ACCESS CREDENTIALS BY ILLEGAL MEANS |
|  420 | SYSTEM ADMINISTRATOR | SUPER-ADMIN(S) OF THE SYSTEM AND HAS FULL CONTROL |
|  425 | PROXIMITY ENVIRONMENT | THE ENVIRONMENT FROM WHERE THE USER CAN ACCESS THE SECURE SYSTEM |
|  430 | ENVIRONMENT PREMISES | THE BUILDING OR THE AREA INSIDE WHICH THE CONTROLLED ENVIORNEMT WOULD BE MAINTAINED |

FIG. 4

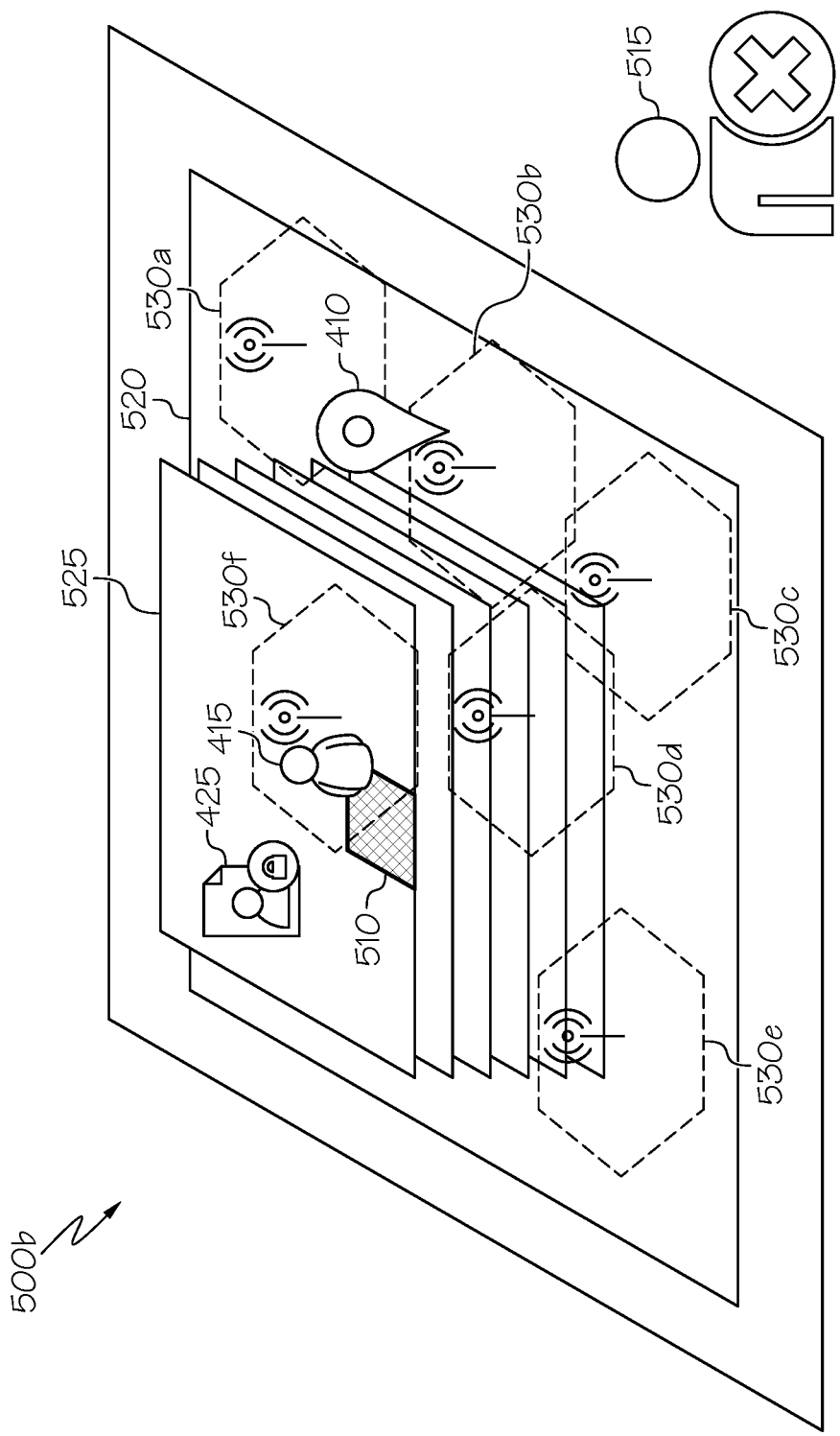

INTEGRATED BIOMETRICS FOR APPLICATION SECURITY

BACKGROUND

The present disclosure relates in general to the field of computer systems, and more specifically, to security of computer system resources.

Modern computing enables the interconnection of different computer networks all over the world. These networks can enable users to access and interact with a variety of resources hosted by a variety of different host computing systems physically positioned in various locations throughout the world. Some of these resources are particularly sensitive and valuable. Securing computing systems and their resources is an important consideration in modern computing and continues to be a challenge given the continually-evolving array of tactics exploited by malicious software authors as well as the never-ceasing development of new computing devices and software and use cases vulnerable to such threats.

BRIEF SUMMARY

According to one aspect of the present disclosure, an attempt to authenticate to a system resource using a particular device and particular credentials may be identified and an identity of a user associated with the particular credentials may be determined. In association with the attempt to authenticate, a location associated with the particular device may be determined and sensor data generated by a set of sensors deployed in an environment may be accessed, where at least some of the sensor data including biometric data. The sensor data can be used to detect a location of the user, and a degree of proximity between the location associated with the particular device and the location of the user can be determined. An authentication action may be triggered corresponding to the attempt to authenticate based on the degree of proximity.

BRIEF DESCRIPTION OF THE DRAWINGS

FIG. 4 illustrates a simplified block diagram representing entities categorized within an example security management system.

FIGS. 5A-5E are simplified block diagrams illustrating an example use of an example security management system.

Like reference numbers and designations in the various drawings indicate like elements.

DETAILED DESCRIPTION

Figure 1:
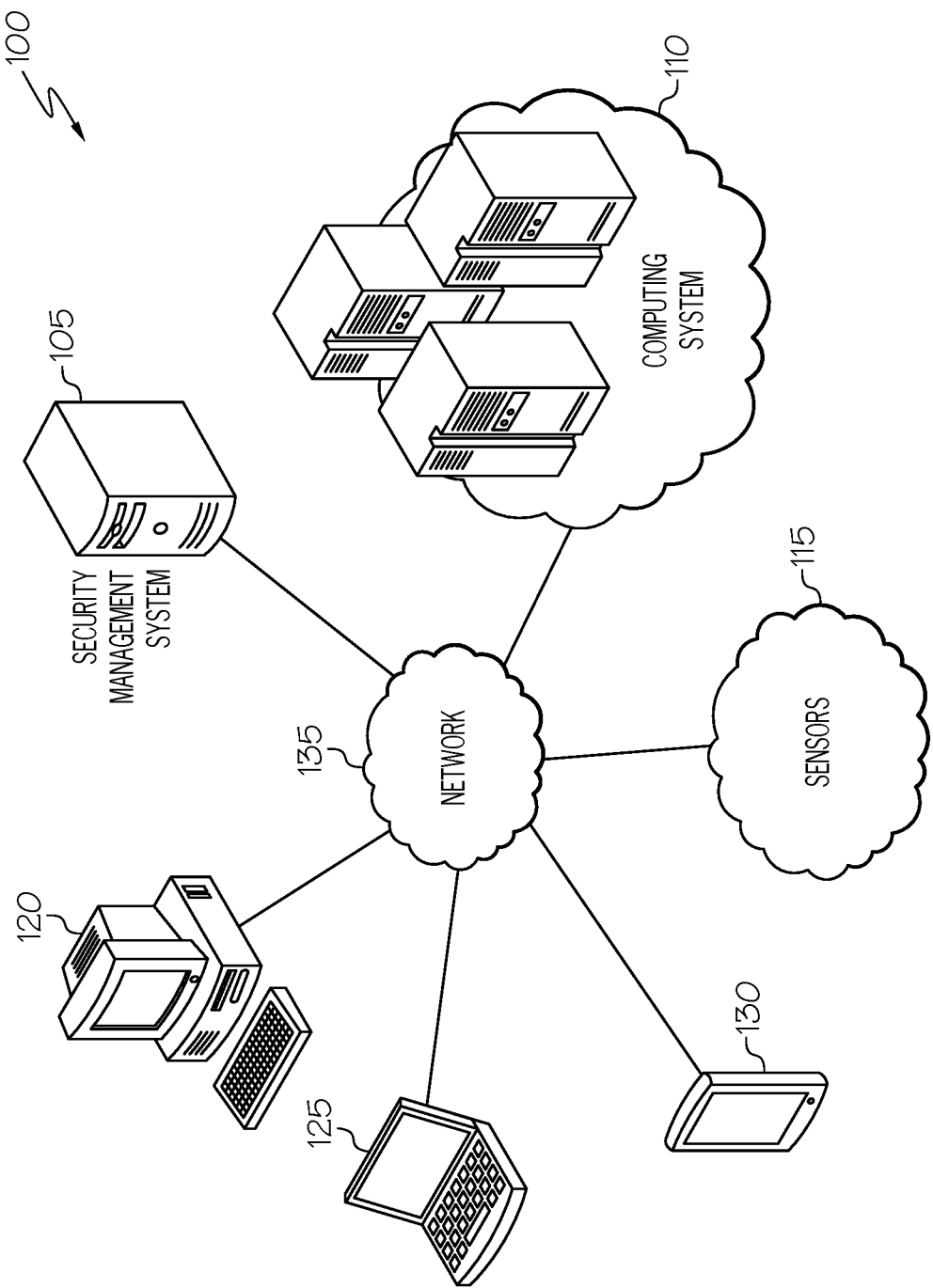
FIG. 1 illustrates a simplified schematic diagram of an example computing environment including an example security management system.

As will be appreciated by one skilled in the art, aspects of the present disclosure may be illustrated and described herein in any of a number of patentable classes or contexts, including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or as a combination of software and hardware implementations, all of which may generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), or in a cloud- and/or fog-based computing environment, or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices, to produce a computer implemented process such that the instructions which execute on the computer or other programmable apparatus provide processes for implementing the functions/acts specified in the flowchart and/or block diagram block or blocks.

FIG. 1 illustrates a simplified schematic diagram of an example computing environment 100. In some embodiments, computing environment 100 may include a security management system 105 with functionality for detecting the illegitimate use of an authentic user credential (e.g., a username/password combination, key card, radio frequency identifier (RFID) token, etc.) to gain access to a secured system resource. The system resource may be a particular program, tool, computing device, data, service, transaction, file, or other resource provided in connection with a computing system 110, such as an enterprise, governmental, academic, research, or military computing system, among other examples. Further, the security management system 105 may provide a variety of security services to protect various aspects of the computing system 110. In some examples, the security management system 105 may be integrated with the computing system for which it provides security. In other cases, the security management system 105 may provide security services to the secure the computing system and potentially other computing systems, among other example implementations.

In some implementations, an example security management system 105 may provide security services to a computing system associated with a particular environment and make use of sensor data generated by a variety of sensors 115 deployed within that environment. For instance, a computing system or network may be implemented in a particular physical environment, such as a campus, building, or office space. A variety of sensors may be provided within the environment, such as cameras, motion sensors, occupancy sensors, voice sensors, microphones, door sensors, window sensors, infrared sensors, card readers and other ID readers, fingerprint scanners, iris scanners, and so on. Some of these sensors may be configured and deployed for the purposes of supporting the security management system 105. Other sensors may be provided for other purposes, such as security of the physical environment, general security, and non-security reasons. Such devices and the data generated by them may be leveraged or repurposed for use as an input to the security management system, such as to identify and corroborate the physical locations of authorized users who are allegedly attempting to access certain system resources (e.g., in system 110) using corresponding credentials, or who have been authenticated and allowed access, but may no longer be physically present at the authorized user endpoint (e.g., 120, 125, 130), among other examples. Sensors 115 may additionally include sensors capable of detecting computing devices within an environment, as well as their locations within the environment. For instance, sensors 115 may include wireless access points, Bluetooth interfaces, RFID sensors (e.g., to read RFID tags provisioned on approved endpoint computing devices (e.g., 120, 125, 130) within an environment, among other examples.

As noted above, a system (e.g., 100) may further include one or more endpoint user devices (e.g., 120, 125, 130, etc.), which may be utilized in some cases to allow a user to interface with and interact with various other systems and components of the computing environment 100, including computing systems (e.g., 110) hosting various sensitive or secured system resources or a security management system 105 used to secure and generate alerts corresponding to security events detected by the security management system. For example, user endpoint devices may serve as terminals to allow users to login to and access various systems, networks, applications, and tools provided in an example computing system 110 (e.g., an enterprise computing system). Endpoint devices may be equipped with an interface to allow a user to interact with the system resource, such as a keyboard, mouse, touchscreen, microphone (for voice controls), and camera (for gesture controls), among other examples. In some cases, interface elements present on the endpoint devices may also serve as sensors usable by a security management system to identify a user of the system or even the location of the device (e.g., through a global positioning (GPS) module or even a webcam or microphone providing information regarding the environment around the device).

Endpoint devices (e.g., 120, 125, 130) may also be utilized to deliver the services of an example security management system 105. For instance, various security actions may be initiated by the security management system 105 in response to the analysis of data input to or otherwise accessed by the security management system 105. As an example, a determination (e.g., based on sensor data collected by various sensors 115 in an environment) that an authenticated user is detected near a particular device being used to access a secured system resource, but where the user's presence at the particular device cannot be confirmed, the security management system 105 may cause a prompt to be displayed on the particular device (e.g., 120) or another device (e.g., 130) associated with the authorized user. For instance, the prompt may be a challenge or the provision of a one-time password to cause the authorized user to verify their presence at and control of an endpoint device used to access a protected resource. In another example, a security management system 105 may utilize endpoint devices to send alerts or other notifications of detected security events to system administrators, building security personnel, an owner of an endpoint device or system asset believed to be compromised, among other examples.

One or more networks 135 may be used to communicatively couple the components of computing environment 100, including, for example, local area networks, wide area networks, public networks, the Internet, cellular networks, internet of things (IoT) or other machine-to-machine (M2M) networks, Wi-Fi networks, short-range networks (e.g., Bluetooth or ZigBee), and/or any other wired or wireless communication medium. For example, a security management system 105 may connect to sensors 115 or data stores containing sensor data generated by sensors 115 to process the sensor data in connection with managing access to various resources of a system. A security management system 105, in some implementations, may also interface with and communicate with those computing systems (e.g., 110) it is protecting. Likewise, various endpoint user devices (e.g., 120, 125, 130) may connect to networks (e.g., 135), including public and/or private networks, in order to access particular system resources, including those protected using an example security management system 105, and may even send and receive communications with the security management system itself (e.g., to receive alerts, receive prompts in connection with a security action, or to configure and define security policies governing the security management system's 105 protection of specific resources or collections of system resources, etc.), among other examples.

In general, elements of computing environment 100, such as "systems," "servers," "services," "hosts," "devices," "clients," "networks," "mainframes," "computers," and any components thereof (e.g., 105, 110, 115, 120, 125, 130, etc.), may include electronic computing devices operable to receive, transmit, process, store, or manage data and information associated with computing environment 100. As used in this disclosure, the term "computer," "processor," "processor device," or "processing device" is intended to encompass any suitable processing device. For example, elements shown as single devices within computing environment 100 may be implemented using a plurality of computing devices and processors, such as server pools comprising multiple server computers. Further, any, all, or some of the computing devices may be adapted to execute any operating system, including Linux, other UNIX variants, Microsoft Windows, Windows Server, Mac OS, Apple iOS, Google Android, etc., as well as virtual machines adapted to virtualize execution of a particular operating system, including customized and/or proprietary operating systems.

Further, elements of computing environment 100 (e.g., 105, 110, 115, 120, 125, 130, etc.) may each include one or more processors, computer-readable memory, and one or more interfaces, among other features and hardware. Servers may include any suitable software component or module, or computing device(s) capable of hosting and/or serving software applications and services, including distributed, enterprise, or cloud-based software applications, data, and services. For instance, in some implementations, a security management system 105, computing system 110, sensor data store, machine learning system (e.g., used by a security management system 105 to process and analyze sensor data, etc.), and/or other sub-systems or components of computing environment 100, may be at least partially (or wholly) cloud-implemented, "fog"-implemented, web-based, or distributed for remotely hosting, serving, or otherwise managing data, software services, and applications that interface, coordinate with, depend on, or are used by other components of computing environment 100. In some instances, elements of computing environment 100 may be implemented as some combination of components hosted on a common computing system, server, server pool, or cloud computing environment, and that share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

As introduced above, computing systems and networks may facilitate access to a variety of different system resources, which may be of importance within a corresponding enterprise, government, or other computing system. Traditional security systems and scheme typically relay on credential-based authentication to precondition access to secured system resources. However, in the event that user credentials are stolen, either through hacking, reverse engineering, theft, or other means, traditional security schemes may be compromised as the nefarious possessor of these credentials may be used to masquerade as the genuine, authorized user and potentially perform any task under the name of the compromised (and authorized) user to whom the stolen credentials belong, poses potential harm to the secure resources and the authorized user (e.g., harm to the user's reputation, bank account, credit, etc.).

An improved security management system may be provided to address existing holes in traditional authentication and computer security solutions. For instance, a security management system may utilize sensors, including biometrics sensors, provisioned in an environment wherein a user accesses secured system resources using an endpoint device (e.g., with the sensors extending beyond those sensors and authentication tools available natively on the device itself), to corroborate the presence of an authorized user at an endpoint device being used to access (or attempt to access) a protected system resource. Indeed, a variety of endpoint devices may also be provided through which users may interface with the computing system and/or the security management system. Sensors used by the security management system may be deployed on the endpoint device itself, other endpoint devices (i.e., other devices other than that being monitored), walls, floors, ceilings, etc. within a physical environment, and may include such examples as building occupancy sensors, cameras, microphones, and other sensors.

In some implementations, an improved security management system may additionally provide functionality to track those users with legitimate authentication privileges while they are within in a premises or environment associated with a system secured using the security management system. In some instances, access to various resources of the secured system may be predicated on the user being within the environment or premises (e.g., to connect to a local network, access particular terminal or other physical tool protected by the security management system, etc. In such instances, the security management system may additionally provide an analytical solution to determine that the user may or may not be logged in based on the physical location tracking of the user(s). On the other hand, traditional secured systems rely predominantly (or exclusively) on an authentication based on a user credential (e.g., the user id and password presented). Even systems requiring multifactor authentication may fall victim to a malicious user who has obtained the multiple authentication forms, allowing an end around of the authentication system. Accordingly, an improved security management system may confirm that a user not only enters the appropriate single- or multi-factor authentication credential(s), but may also determine (e.g., from sensor data obtained outside of that obtained at the user endpoint itself) that the user logging in is the same person as the personal identity linked to the credential(s), among other example features and advantages.

Through the provision of an improved security management system that provides functionality to attempt to ensure that the person logging into a secure resource is logically expected to log in (e.g., based on sensor data collected within a corresponding environment). Such a solution can address examples scenarios such as the use of shoulder surfing or reverse engineering to obtain authentication credentials, and collusion of an authorized user with an unauthorized user to provide the unauthorized the credentials in an attempt to allow inappropriate access to secured resources (wherein the authorized user stays out of the environment premises to later show plausible deniability or have an alibi, etc.). An improved security management system may additionally be used to detect and protect unattended systems that may be used to obtain illegitimate access to system resources, including remotely located system resources, and other example uses.

Figure 2:
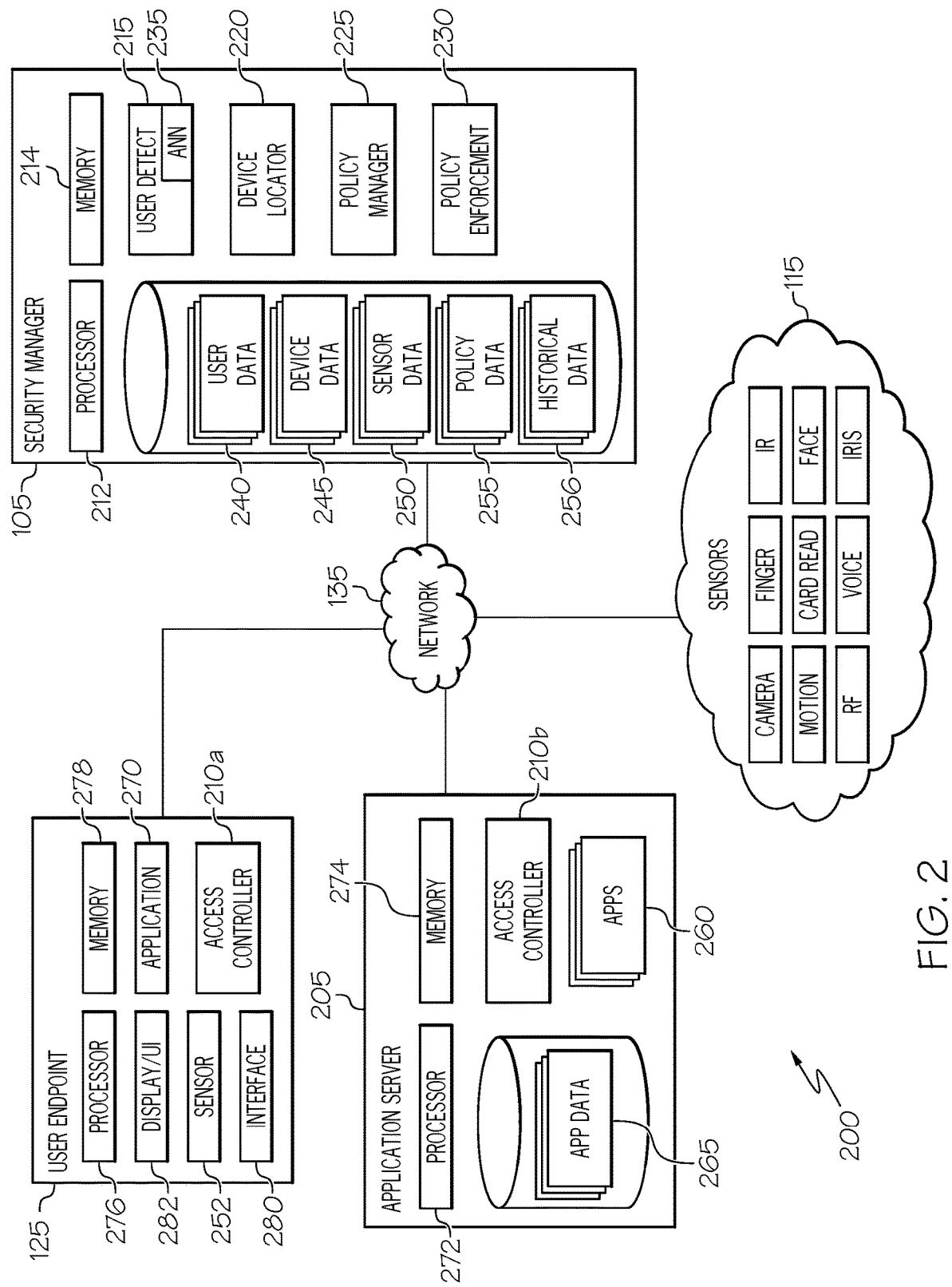
FIG. 2 illustrates a simplified block diagram of an example computing system including biometric sensors and an example security management system.

Turning to FIG. 2, a block diagram 200 is shown of an example system including an example security manager system 105 providing functionality capable of addressing at least some of the example issues above. For instance, a security management system 105 may be provided to protect various system resources hosted on the same or another computing system, such as a server (e.g., 205) of various applications and services (e.g., 260), data, or other resources, a user endpoint device (e.g., 125) and data and programs hosted locally thereon, among other examples (and combinations thereof). In some implementations, a security manager 105 may operate in association with access controller logic (e.g., 210a,b) implemented on the system(s) hosting or otherwise providing access to the system resources being protected. For instance, the security manager 105 may determine a security event associated with a particular system resource (e.g., based on sensor data (e.g., 250) generated by one or more sensors 115 in a deployment) and interface with a system (e.g., 125, 205) determined to correspond to the system resource (e.g., via an access controller 210a,b) to trigger performance of a security action on the system (e.g., 125, 205) in an attempt to remedy the security event.

In one example, a security manager 105 may include one or more processor apparatus 212 and one or more computer-readable storage elements 214, and the processor apparatus 212 may be utilized to execute hardware-, firmware-, and/or software-based logic to implement various components, such as a user detection engine 215, device locator 220, policy manager 225, policy enforcer 230, one or more interfaces (to allow the security manager 105 to interface with other systems (e.g., 125, 205) and sensors 115, among other examples, including sub-divisions or combinations of the foregoing. In one example, a user detection engine 215 may be provided to identify one or more user identities associated with a system monitored by the security manager 105. In some implementations, a set of users may be designated within a system as authorized to access one or more secured resources of the system. For instance, user data 240 may identify registered or authorized users within a system, devices registered or assigned to these users, personal attributes of the users, offices or other physical spaces associated with the user within a workspace or other environment, credentials associated with the users, policies, restrictions, or permissions assigned to each user and defining access rights to various system resources, among other information. User data 240, in some implementations, may additionally include biometric reference data associated with the set of users, such as facial images, voice samples, fingerprint samples, iris samples, among other examples. A user detection engine 215 may further access sensor data 250 generated by a collection of sensors 115 deployed within an environment and detect (e.g., through a comparison of information from the sensor data with user attributes identified in user data 240) the presence of a user within an environment. Sensor data 250, in some implementations, may be collected and stored by the security manager 105 as the sensor data 250 is generated by various sensors 115 within an environment. In other instances, the security manager 105, such as a user detection engine 215, may receive at least some sensor data 250 as it is generated, substantially in real-time, as a stream of sensor data 250, and may process the sensor data 250 to detect users, both known (e.g., registered or otherwise previously identified in the environment (and for whom user data 240 is available) and unknown to the security manager 105, within the environment.

As noted above, a user detection engine 215 may access and utilize user data to determine the presence of particular users within a system. In some implementations, the user detection engine 215 may include machine learning functionality, such as logic implementing and/or using an artificial neural network (ANN) 235 (e.g., a spiking neural network (SNN), convolutional neural network (CNN), etc. that may be trained from information in the user data 240, historical sensor or system data (e.g., 256), among other examples), to determine that information included in particular sensor data identifies or is evidence of the presence of a particular one of the set of users within the environment. A user detection engine 215 may further include functionality for determining the location of the user from sensor data 250 by mapping the detection of the user to a particular location within the environment (e.g., based on the position and/or location of the sensor within the environment, etc.). Accordingly, results of the user detection engine 215 may identify not only that a particular user has or has not been detected within an environment, but may also determine a more particular location of the user within the environment. Further, as the particular user moves within the environment, additional sensors 115 may generate sensor data (e.g., 250) that may be used by the user detection engine 215 to detect the changing position of the user and effectively track the user's movement within the environment. Additionally, in some implementations, user detection engines (e.g., 215) may detect anomalies in the location and/or behavior detected for a user within an environment as compared with movement and usage patterns of that user (or similar users) described in historical data 256. For instance, a user may be detected (e.g., using user detection engine 215) in a room housing a particular protected resource and a security event may be generated (e.g., based on a corresponding security policy) based on determining that the user's presence in this location is out of the ordinary (e.g., based on heuristic and/or machine learning recognition of a statistically significant deviation from a profile of the user), among other example features.

The results of the user detection engine 215 may further be used (e.g., by policy enforcement logic 230) to determine security events based on the detected position of a particular user within an environment. As an example, an attempt by a user on a particular user endpoint or terminal device (e.g., 125) may be detected. In some implementations, the login attempt may be detected by the user endpoint 125 or another system (e.g., 205) associated with the login and/or the system resource(s) for which access is requested, and the detecting system may request security services of the security manager 105 to determine whether or not to grant the login request (or other authentication attempt). In other implementations, the security manager 105 may have visibility into the system(s) for which it provides security services and the security manager 105, itself, may identify the authentication attempt, among other example implementations.

In response to the authentication attempt (e.g., and a request for assistance in analyzing the attempt received by the security manager 105), the security manager 105 may identify a user associated with the attempt (e.g., a user associated with a credential or account used or identified in the authentication attempt) and may utilize contemporaneous sensor data 250 to determine the location of the identified user within the environment. The security manager 105 may determine whether the location of the user (e.g., as detected from the sensor data 250) corresponds to the computing device used to make the authentication attempt. Accordingly, in some implementations, device locator logic (e.g., 220) may be provided to determine a physical location of various computing devices within an environment. For instance, in response to detecting an authentication attempt (e.g., that implicates one of more security policies of a system or specific system resources (e.g., as defined in policy data 255)) the security manager 105 may utilize device locator logic 220 to determine a location of the particular computing device used to perform the authentication attempt. This location may then be compared with a location determined for the particular user who is allegedly using the particular computing device to perform the authentication attempt, to confirm that the proper user is making the authentication attempt. For instance, the device location may be determined by identifying the device, for instance, from address information (e.g., IP address, MAC address, etc.) communicated in connection with the authentication attempt. The address information (or other device identifiers identifiable from the authentication attempt) may be utilized to determine the device's identity (e.g., through a comparison with device attribute information included in device data 245). In some cases, a device may be registered as an approved or known device within a system. In one example, some devices may be considered stationary devices, in that they are strictly assigned a location within the physical environment or due to the characteristics of the device (e.g., devices of types considered not easily mobile and likely to remain in the location of their last installation). Such information may be retrieved, for instance, from device data 245 corresponding to the device. In cases where the device is determined to be stationary, the device data 245 may be accessed (e.g., by the device locator 220) to determine a location associated with the stationary device.

In other cases, the particular device used to perform an authentication attempt under analysis by a security manager 105 may be determined to be a mobile device (or at least a potentially mobile device) and other inputs may be utilized by the device locator 220 to determine the particular device's location. In some instances, location of the particular device may be determined, or at least predicted, based on detecting the device's connection to a network associated with the environment. For instance, the device may connect to or send data to one or more wireless access points within the environment, from which a location of the device (e.g., a particular floor of a multi-floor building, a particular portion of a campus, etc.) may be determined. In other cases, such as where the device connects via an Ethernet or other physical network connection, the port to which the particular device connects may be mapped to a particular location within the environment. In still other examples, additional sensors (e.g., 115) may be utilized, which may observe and collect information regarding devices within an environment. For instance, RFID readers deployed in particular locations within an environment may read RFID chips tagged on approved devices, cameras may observe graphics displayed on devices within the environment (e.g., to determine that a particular device is on a log-in page corresponding to a detected or reported authentication attempt), a Bluetooth module in a particular location within the environment may detect a Bluetooth-enabled device, among other examples, and resulting sensor data (e.g., 250) may be utilized (in some cases combined with other information (e.g., from additional sensors) to determine a current location of the device. Further, in cases of mobile computing devices, the device locator 220 may additionally rely on sensors and network access points (and device data 245 indicating the location of these sensors) to identify and track changes in the location of a device. In some cases, locating a device may be in response to identifying an attempt to access particular system resource (e.g., and in accordance with an example security policy defined in policy data 255), and the corresponding user location may be likewise analyzed and determined (e.g., using user detection engine 215) responsive to the detection of the authentication attempt, among other examples and features.

Operation of a security manager 105, as noted above, may be guided and customized based on particular security and enforcement policies defined for one or more system resources associated with a physical environment and one or more system users. This policy information may be defined and maintained in policy data 255 by a policy manager 225 component. For instance, an administrator may select predefined policy templates or define custom policies (e.g., using a policy manager 225) to specify access rights and restrictions, authentication protocols and requirements, access and use conditions, among other policies for various resources within a system. Some policies may dictate that attempts to access a particular system resource cause the security manager 105 to corroborate a corresponding authentication attempt with the location of the corresponding legitimate user at the device used to perform the authentication attempt. The policy may additionally define automated resource access locking, logout, or other protective techniques in the event an authenticated user is determined to have left the presence of the device used to access a particular system resource associated with the policy. The degree(s) to which a user is allowed to physically remove themselves from the particular device while still be allowed to complete or maintain authentication to the protected resource may also be defined by one or more corresponding policies (e.g., the length of time a user may remove themselves from the particular computing device and/or the distance from which the user may be removed from the location of the particular computing device, etc.).

A policy enforcement module 230 may additionally be provided with a security manager 105 and may additionally trigger or perform various security actions in response to detecting a violation of a particular policy or other security event. Indeed, security policies, in some implementations, may additionally define countermeasures or remedial action in response to various types of violations of the policies. For instance, security policies may define that access to a particular system resource be denied, a network communication terminated, or even a user device disabled in response to a determination (by the security manager) that a corresponding security policy has been violated. The policy enforcement manager 230, in some instances, may interface with other systems (e.g., 125, 205) to cause the security action to be invoked or performed. For instance, the policy enforcement manager 230 may send data (e.g., over a network 135) to a particular device (e.g., 125) detected as involved in an illegitimate authentication attempt to cause the particular device to take remedial measures (e.g., lock the workstation, protect memory access, lock user interfaces, close a user session, etc.) based on instruction from the policy enforcement manager 230 (e.g., responsive to a security event detected by the security manager 105 (such as detecting use of a particular user's credentials at an endpoint device when the particular user not detected as being in the same location as the endpoint device). In another example, a policy enforcement manager 230 may interface with a host of a protected resource or another system (e.g., 205) used to access the resource (e.g., a proxy server, frontend server, web client, etc.) and cause a security action to performed at the system (e.g., 205), such as disallowing authentication to a particular resource, despite legitimate credentials being used (albeit by a user other than the authorized user), blocking a connection with the endpoint device being used by an illegitimate user, ending a session, among other examples.

Sensors 115 deployed within a particular environment may include multiple instances of the same type of sensor, as well as instances of different types of sensors. Some of the sensors 115 may collect biometric information about various users within an environment, such as users' fingerprints, faces, voices, irises, gait, or other distinguishing biometric characteristics. In some cases, logic may be provided in security manager 105 to extract biometric information from raw sensor data, such as facial recognition or user recognition from raw video data using a neural network (e.g., 235), machine learning, or other logic. Sensors 115 may include such examples as cameras, infrared sensors, radio-frequency-based sensors, card or other ID readers, face detectors, iris detectors, fingerprint readers, motion detectors, voice signature recognition, etc.

System resources protected by a security manager 105 may be hosted on a variety of different computing systems. For instance, a server system (e.g., 205) may be provided that hosts particular data resources (e.g., 265) or particular applications, tools, code, or programs (e.g., 260), which may be accessed using a client computing device or terminal. Such server systems may include one or more data processing apparatus 272, one or more memory elements 274, and various components, including those implementing or embodying one or more system resources protected using the security manager 105. In some implementations, the system manager 105 may be integrated with the system (e.g., 205) hosting the protected system resources). In other instances, the security manager 105 may be hosted on a remote system and may interface with the host system 205 using an access controller (e.g., 210b) enabling the security manager 105 to communicate with the access controller (e.g., 210b) and report suspicious actions or authentication attempts to access various sensitive resources to the security manager 105. Likewise, the security manager 105 may communicate results of its analysis to the access controller 210b along with, in some cases, security action instructions, to cause remedial actions to be performed, at least in part, on the host server 205, among other examples.

While user endpoint devices (e.g., 125) may be utilized to access system resources hosted on a network (e.g., 135) by other host systems (e.g., 205), some sensitive system resources (e.g., 270) may also, or instead, be hosted on the endpoint devices (e.g., 125) themselves. Further, the endpoint devices (e.g., 125) may be used in connection with a security manager 105 to block, challenge, or otherwise protect against unauthorized use or access to various system resources. In one example, a user endpoint device 125 may include one or more data processor apparatus 276, one or more memory elements 278, a display and/or other user interface elements (e.g., 282), a network interface 280, among other components. While some sensors (e.g., 252) be provided locally on some endpoint devices to assist in protecting the endpoint and its resources, these sensors (e.g., 252) may be supplemented and/or corroborated using the information generated from a variety of other sensors (e.g., 115) used in an environment in which the endpoint device 125 is, or can be, located. An access controller (e.g., 210a) may be provided in some implementations, to allow an interface to the security manager 105, in some cases providing the security manager 105 visibility into security events and system resource access attempts at the device 125, as well as allowing the device 125 to receive and perform security events responsive to the security events at the direction of the security manager 105, among other examples.

Figure 3:
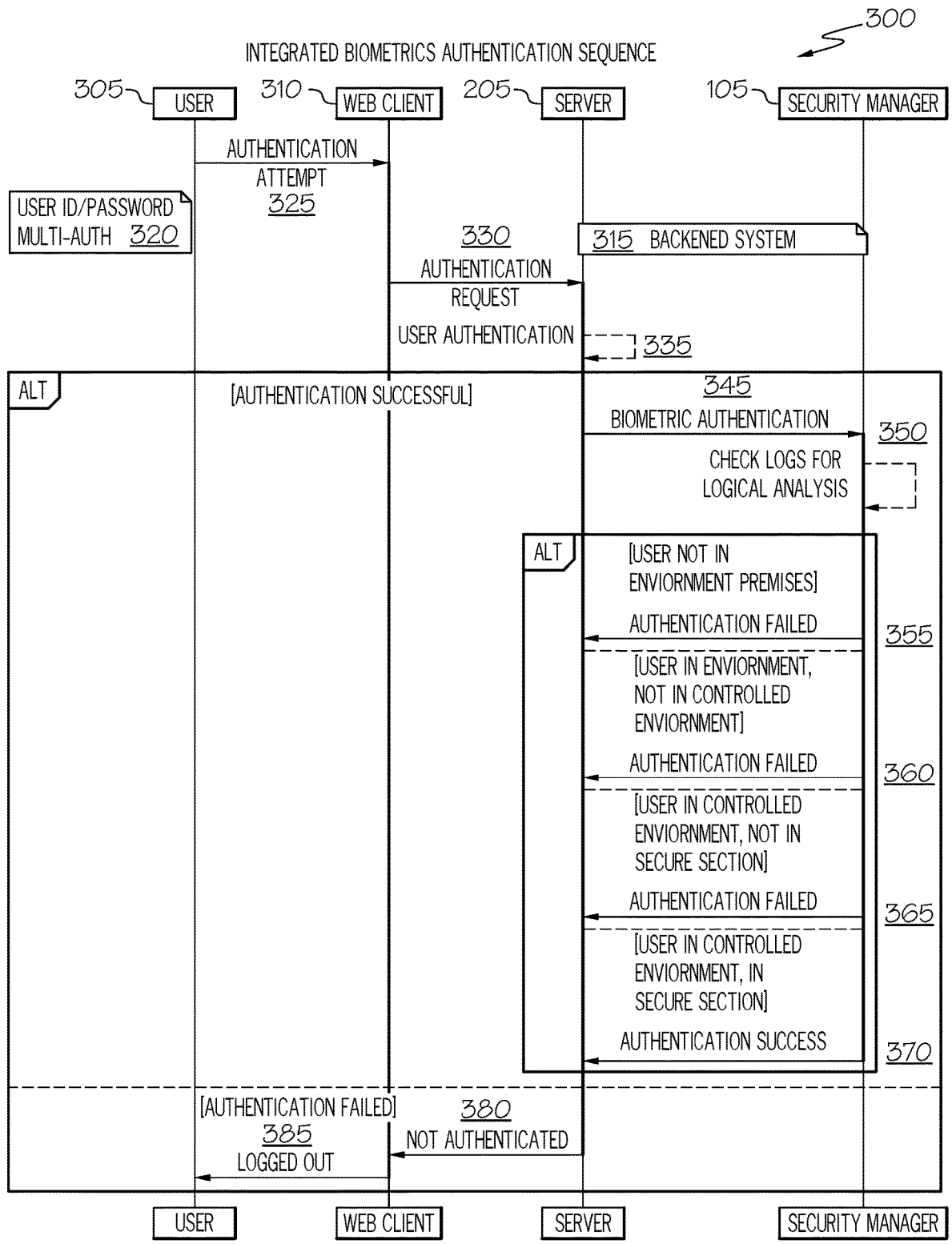
FIG. 3 illustrates a flowchart representing an example authentication sequence.

Turning to FIG. 3, a flowchart 300 in presented illustrating an example authentication sequence using an improved security management system. For instance, the authentication sequence can involve a user 305, web client 310 (or other program utilized by the user to access a particular system resource), a server 205 (e.g., hosting the resource), and the security management system 105. The user may obtain (legitimately or illegitimately) one or more credentials (e.g., 320) assigned to a particular user identity. For instance, the credentials 320 may include a single- or multi-factor authentication credentials, including a user ID/password combination, among other examples. The user 305 may utilize the credentials 320 in an authentication attempt 325, providing the credentials 320 to the web client 310 in an attempt to access the protected system resource(s). In this example, the server 205 and security manager 105 may represent the backend system 315 and the web client 310 may generate an authentication request from the authentication attempt 325 that is communicated from the web client 310 to the server 205 to trigger a user authentication process 335.

In the example of FIG. 3, the user authentication process 335 may include determining whether the user authentication implicates one or more secured system resources. In one example, the server 205 may determine that assistance is needed from the security manager 105 before granting the authentication request 330 relating to a particular system resource. For instance, the server 205 may determine that a biometric-based location corroboration be performed (e.g., based on a policy determined to apply to the authentication request 330), and the security manager 105 may send a biometric authentication request 345 to the security manager 105. The security manager 105 may determine the device used in the authentication attempt 325 and may utilize sensor data generated by various sensors deployed within an environment to attempt to detect the particular user associated with the credential 320 used in the authentication attempt 325 within the environment. In some implementations, log information detailing device attributes, including device location may be accessed and used (e.g., at 350) to determine the location of the device (e.g., from a location recently determined at or a short time before receipt of the authentication request 350)). If it is determined that the particular user is not in the environment (e.g., at 355), the security manager 105 can return an authentication failed result to the server 205. A controlled environment may be defined within a region encompassing the device used in the authentication attempt. If the user is detected in the environment, but not in a region near the device (e.g., in the controlled environment (e.g., as defined in a policy corresponding to device and/or the protected system resource)), the security manager 105 can likewise return an authentication failure notice (e.g., 360).

Still further zones, or levels of granularity may be defined to compare a user's location with that of the endpoint device being used in the authentication attempt 325. For instance, a secure section corresponding more precisely to the location of the device (or representing collocation with the device) may be defined, to correspond with what would be expected were the user at the device and using the device (e.g., to perform the authentication attempt 325). In this example, if the security manager 105 determines that the user is in the environment, and even the controlled environment, but not collocated with the device (e.g., at 365), then the security manager may again return an authentication failure notice, otherwise, the security manager 105 may confirm (e.g., at 370) that the user associated with the credentials 320 used in the authentication attempt 325 associated with the server's biometric authentication request 345 to the security manager is using the device used in the authentication request and report a successful result 370 of the biometric authentication/confirmation process 350 performed by the security manager. In the event the security manager 105 returns a "success" result (e.g., 370), the server 205 may verify that the credential is authenticate and may authenticate the user 305 based on the authentication attempt, thereby granting access to one or more secured system assets. On the other hand, if a negative result (e.g., 355, 360, 365, etc.) is returned by the security manager 105 to the server's request 345, the server 205 may respond by not authenticating (e.g., 380) the current user 305 resulting, in this example, in the user 305 being refused 385 the log-in or being automatically logged out 385 of an existing session (based on a previous, legitimate log-in by the user associated with the credentials 320), among other examples FIG. 4 illustrates a diagram 400 showing definitions that may be utilized by the security management system and in policies defined and applied by the system utilizing an integrated biometrics authentication sequence and/or other authentication security protocols and algorithms executed using an improved security management system, such as discussed herein. Such definitions or logical entities may include the Secure System 405 (e.g., the target system, which is to be secured using the security management system); an Authenticated User 410 (e.g., a legal user registered to the Secure System 405); a Culprit 415 (e.g., a malicious actor or other person who may have acquired the access credentials by illegal means); a System Administrator 420 (e.g., a Super-Admin(s) of the system with full control); a controlled Proximity Environment 425 (e.g., the environment from where the user can access the Secure System 405); and the Environment Premises 430 (e.g., the greater geographical area (e.g., a particular building, floor, grouping of buildings in a campus, etc.) inside which the controlled environment would be maintained, among other example entities.

Turning to the example illustrated in the simplified block diagrams 500a-e of FIGS. 5A-5E, an example is shown of the use of an improved security management system. In this example, an environment 520 is shown in which the security management system is deployed together with multiple sensors of potentially multiple different types. A policy may be defined for one or more system resources, such as various applications, programs, data, data stores, tools, devices, networks, etc. The policy may specify that authentication of a user to the system resource involve corroborating the user's use of the device in the authentication.

For instance, a particular authentication attempt may be detected involving a malicious user 415 using a particular computing device and a set of credentials. In response to the authentication attempt, the location 510 of the particular computing device may be determined. In this example, the location of the computing device may be based at least partially on determining that the particular device is connected to a network associated with the environment 520 via a particular one of a collection of network access points, such as wireless access points 530a-f. In this example, the computing device accesses the network via a wireless access point 530f providing network connectivity to devices within a building 525 in the environment 520 and, more specifically, to devices in a portion of a sixth floor of the building. Upon determining a general location of the particular device (e.g., based on a location corresponding to the network access point 530f), in some implementations, additional sensors may be utilized to determine a more precise location of the particular device. In other cases, a precise location of the particular device may be determined based on device data specifying a location within the environment 520 in which the device is assigned or deployed. The device data may be accessed in response to determining the identity of the particular device (e.g., from an identifier included in the authentication attempt as intercepted by the system). Further, in some implementations, an assigned location of the device may be compared with the detected location of the device, with a deviation from the assigned location being interpreted by the security management system as evidence of a potentially illegitimate authentication attempt (as defined in a corresponding security policy), among other examples.

Given the location of the particular device, a set of proximity zones may be defined that correspond to the particular computing device used in the authentication attempt based on a policy identified as associated with the authentication attempt. A first proximity zone may correspond to the location 510 of the particular device itself and may refer to a secured zone of the environment pertaining to this authentication attempt, as the secured zone (e.g., 510) corresponds to the physical location in which access to the secured system resource is attempted. Additional proximity zones may also be defined in accordance with the corresponding policy, such as a controlled environment zone outside of but in close proximity of the secured zone. The size of the controlled environment zone (e.g., 425) may be determined based on criteria and specifications in the policy.

As examples, the controlled environment zone 425 may be defined as a section of the environment within a certain radius of the secured zone, as a particular room or floor in which the secured zone is found, among other examples. Still further proximity zone may be defined, including zones outside of the controlled environment zone, such as a zone corresponding to the environment (e.g., a building, office space, campus, etc.), among other examples as may be defined in a corresponding security policy for an environment and those system resources secured within the environment.

Figure 5A:
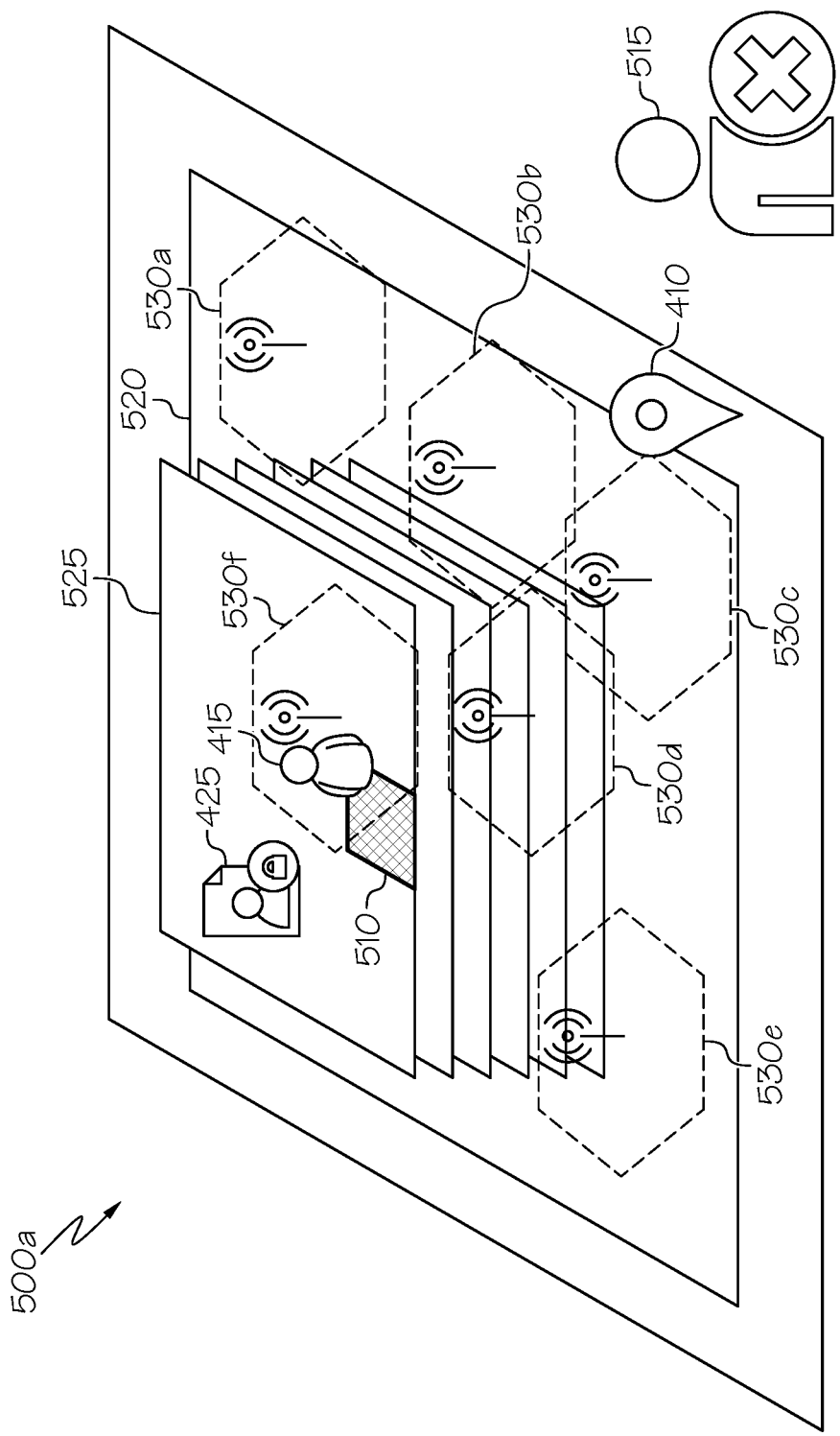

Continuing with the example of FIG. 5A, in response to detecting the authentication attempt using particular user credentials and determining the location 510 of the device used to perform the authentication attempt, the security management system may identify an authenticated user (e.g., 410) associated with the particular credentials and access sensors and/or sensor data generated by sensors deployed within the environment 520 to attempt to detect the authenticated user 410 and determine whether and where the user 410 is located in the environment 520. In the scenario illustrated in FIG. 5A, the security management system may access sensor data generated contemporaneously with the authentication attempt and fail to identify biometric information corresponding to the authenticated user 410 from the sensor data. Accordingly, in this example, the security management system may determine that the authenticated user is not only not at the location of the device 510 used in the authentication attempt, but not in the environment at all. As a result, the security management system can cause the authentication attempt to be denied (at 515). Additional security actions may also be invoked by the security management system based on failing to identify the physical presence of the authenticated user, such as triggering an alert that causes additional information to be recorded (e.g., by sensors) to attempt to document who is in the device's location 510 and attempting to illegitimately authenticate to the protected system resource. In one example, a microphone or webcam of the particular device may be remotely activated based on an instruction from the security management system to attempt to capture images or voice samples of the illegitimate users. In other examples, security actions may include the generation of an alert that is sent to the authenticated user, the owner of the secured system resource, a system administrator, building security personnel, among other examples to notify of the detected abnormality with the authentication attempt, among other examples.

In the example of FIG. 5B, an alternative scenario is detected where a similar authentication attempt is made by the malicious user 415 at the particular device in an attempt to access the same system resource. Similarly, in this example, the security management system again accesses sensor data in an attempt to perform biometric, location-based authentication of the authenticated user 410 corresponding to the credentials used (by malicious user 415) in the authentication attempt. However, in the example of FIG. 5B, sensor data is processed to detect the authenticated user as located in the environment (e.g., based on detection of the user's face in video data captured within the environment 520, or other biometric information captured by another type (or combination of) sensor(s) in the environment 520, etc.). The location of the authenticated user 410 may also be determined, for instance, from the location of the sensor that generated the data from which the user 415 was identified, from background context captured in the sensor data (e.g., background imagery captured by a camera, background noise captured by a microphone, etc.), or other information. In this example, the user 410 is again determined (at 515) to be located outside of a zone (e.g., 510, 425) corresponding to use of the particular device, and the authentication attempt (by malicious user 415) may again be thwarted by the security management system and other security actions may be triggered based on one or more policies associated with the authentication attempt.

Figure 5C:
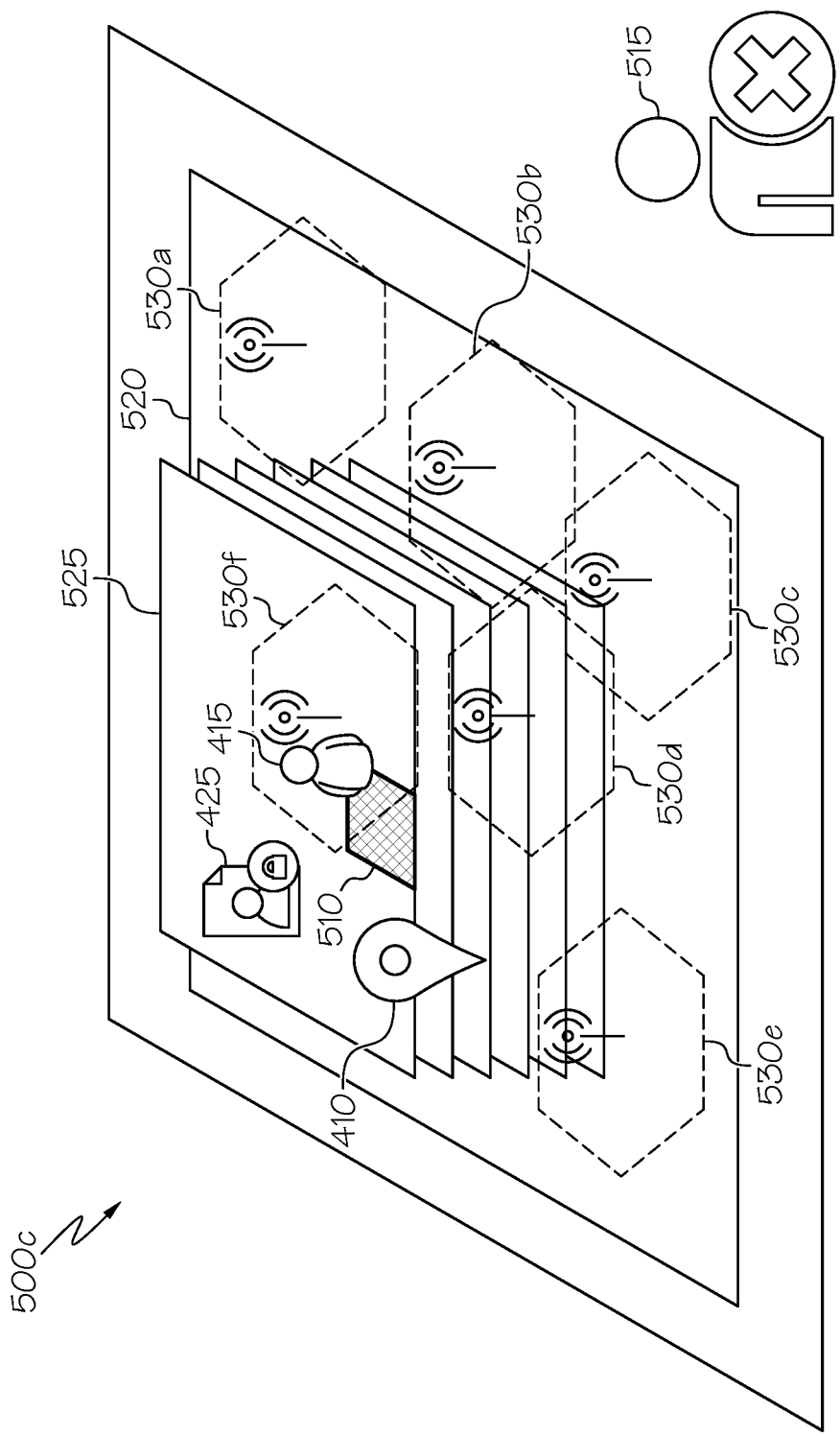

Turning to FIG. 5C, yet another scenario is illustrated, with an authentication attempt at device 510 (by unauthorized user 415) again triggering a biometric-based location detection of the authentic user within the environment 520 using sensors deployed throughout the environment 520. In this example, the authentic user 410 is identified as located in the fourth floor of the building 525 in which the particular computing device is detected. While closer to the location 510 of the particular device than in the example of FIG. 5D, detecting the authentic user 410 outside of proximity zones (e.g., 425, 510) suggesting the authentic user's 410 involvement in the authentication attempt can cause the security management system to intervene in and halt the authentication attempt (at 515).

Figure 5D:
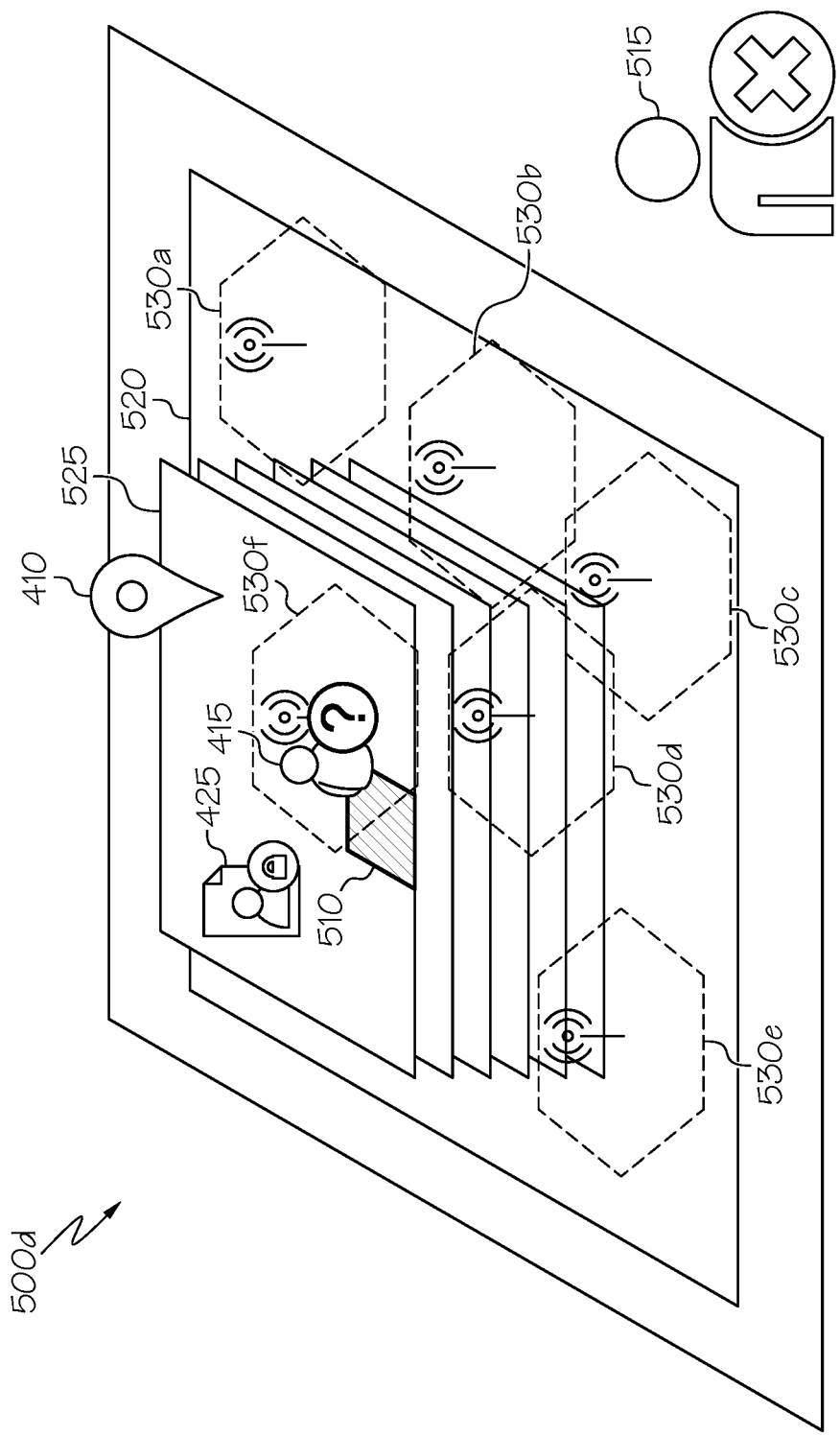

In the example of FIG. 5D, an authentication attempt by a user 415 other than the authenticated user (corresponding to the credentials used in the authentication attempt) may again cause a biometric-based location detection of the authentic user 410 within the environment 520. In this example (unlike the examples of FIGS. 5A-5C), the authentic user 410 is detected within the controlled environment zone 415, but not within the secured zone 510. Such a finding may be interpreted by the security management system to nonetheless question that authenticity of the authentication attempt, as the user 410 is close enough to have potentially been involved in the authentication attempt (e.g., the user 410 entered the credentials but then left her desk to grab a coffee in a nearby breakroom), but not definitively collocated with the particular device (as could be concluded if the user were located in the secured section 510). In some implementations, determining that a user is in a controlled environment zone 425, or a proximity zone indicating an uncertain likelihood that the authentic user 410 is the source of the authentication attempt, the security management system may require a challenge or additional authentication data from the user of the particular computing device before allowing the authentication attempt to be approved. For instance, a one-time password (OTP) may be sent to a mobile phone or other personal device associated with the authenticated user, requesting that the user enter the one-time-password in order for the authentication attempt to proceed. If the authentic user 410 did not make the authentication attempt, this message may also serve as a notification to the user 410 that a potentially illegitimate authentication attempt is being made. In other examples, a message may be sent to the authentic user's associated personal device to ask the authentic user to confirm that the detected authentication attempt is legitimate and wait for confirmation from the authentic user as a precondition for allowing the authentication attempt. In still another example, a challenge question may be presented to the user (e.g., 415) of the particular computing device in response to detecting the authentic user near, but not at, the particular computing device, with the answer to the challenge being a secret known only to the authentic user and a correct answer being a prerequisite to approval of the authentication attempt. In another implementation, the security management system may notify another person within the environment of the questionable authentication attempt (such as a user in a nearby office, a security guard, etc.) and require this notified user to confirm the legitimacy of the authentication attempt (e.g., by responding to the notification prompt) before allowing the authentication attempt to be approved, among other examples (or combinations of the foregoing). In the example of FIG. 5D, the challenge(s) issued by the security management system in response to detecting the authentic user in the controlled environment zone 425 fail (at 515) as the authentic user is not at the particular device and is not the source of the authentication attempt.

Figure 5E:
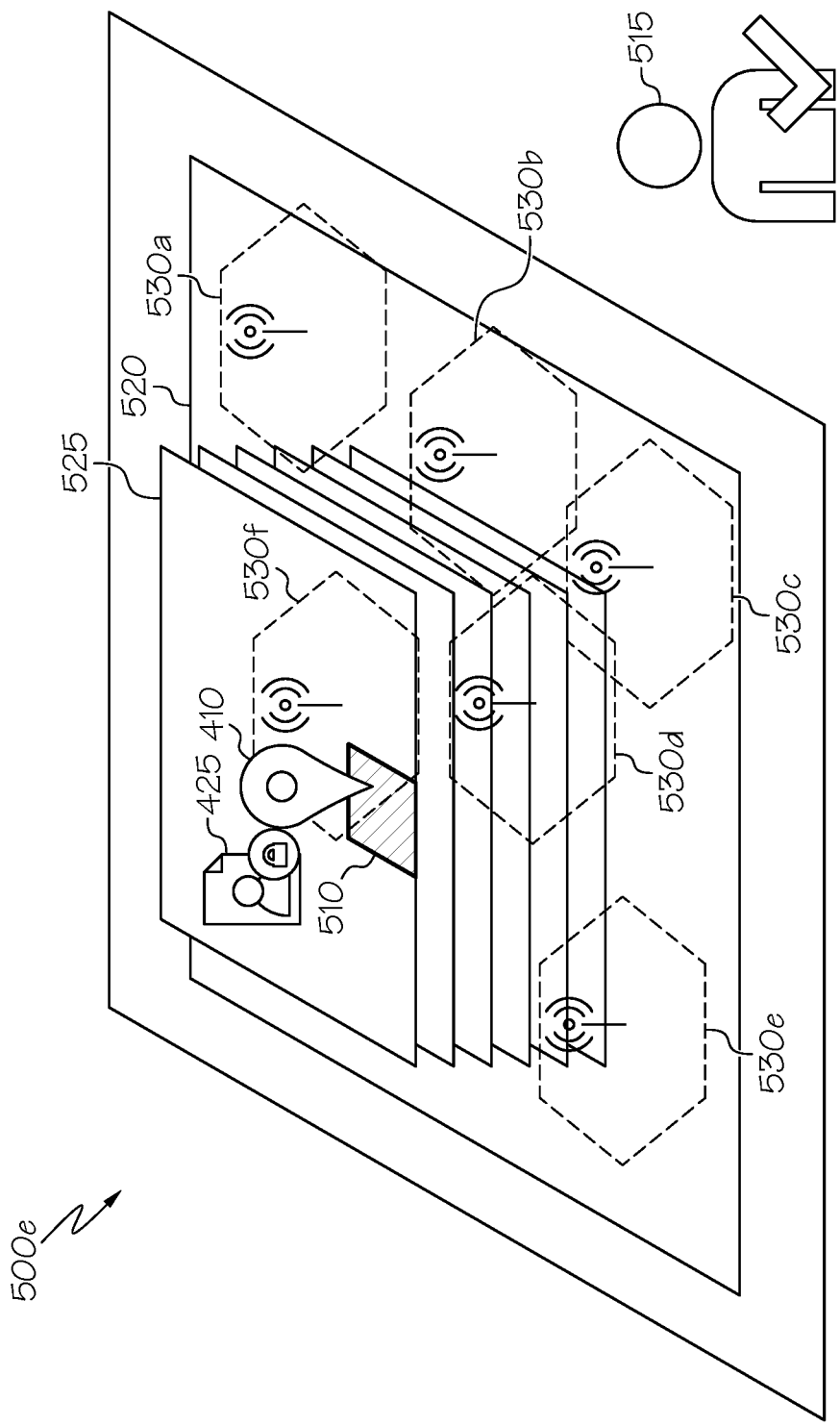
Figure 6:
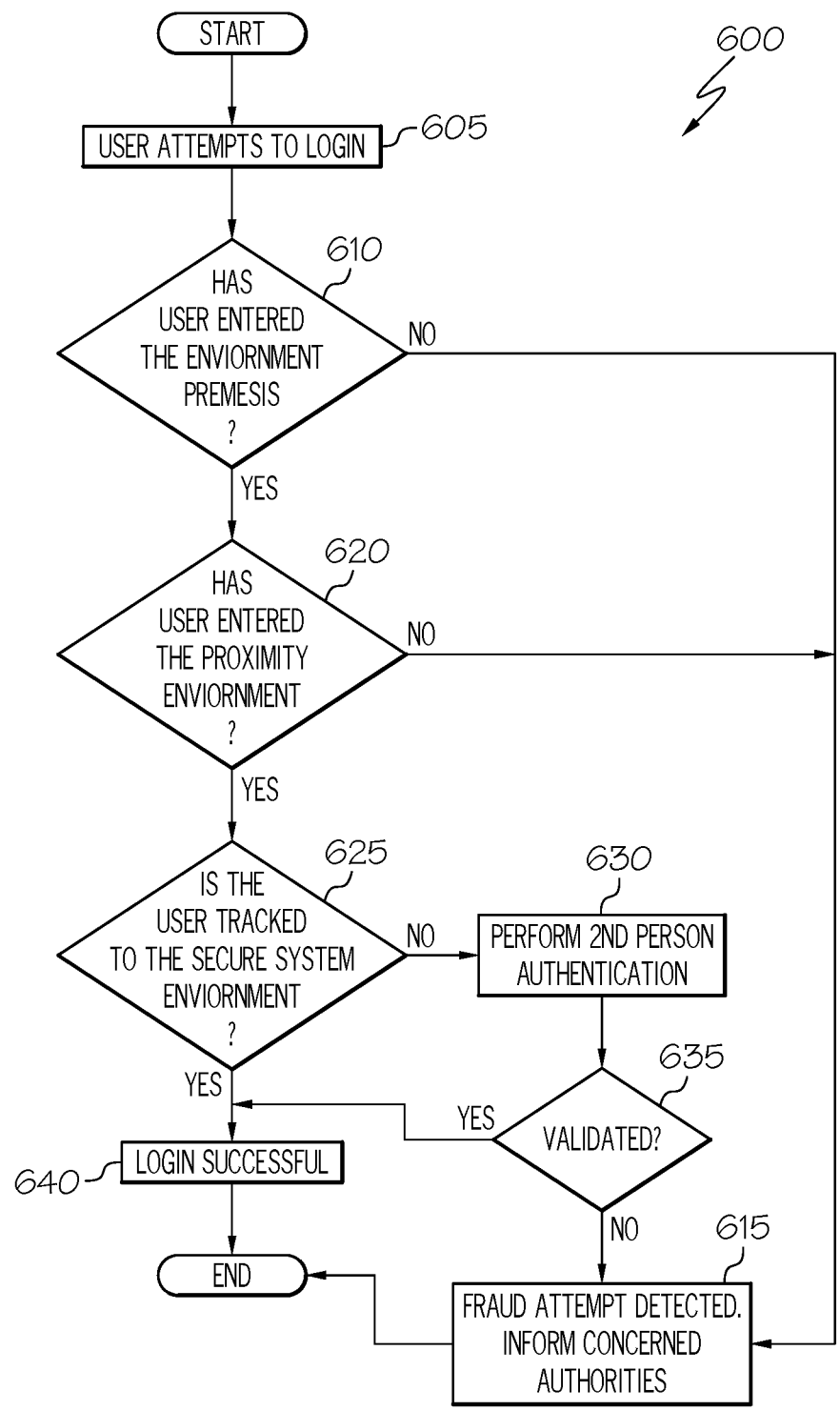
FIGS. 6 and 7 are flowcharts illustrating example techniques involving an example security management system.

In the example of FIG. 5E, another scenario is shown, where an authentication attempt is detected as being generated using a particular computing device in a location 510 by a user. The authentication attempt can invoke a policy that causes a security management system to perform (as in the examples of FIGS. 5A-5D) a biometric-based location authentication to determine whether a user associated with credentials used in the authentication attempt is located at or near the location of the particular device used in the attempt. In this example, sensor data is accessed by the security management system and processed to detect the authentic user 410 and determine the authentic user's location within the environment 510. In this example, the security management system determines, from the sensor data, that the authentic user 410 is, indeed, collocated with the particular device (i.e., in secured section 510) resulting in the security management system allowing the authentication attempt and granting (at 515) the user 410 access to the corresponding protected system resources.

If the security management system detects an authentic user within a proximity zone based on an identified login attempt made by a particular device, the security management system may additionally determine 625 whether the position of the authentic user is within a secure section corresponding to the user being collocated with the particular device. If it is determined that the authentic user is within a proximity zone outside of the secure section, then the security management system 630 may cause a supplemental authentication step (e.g., 630) to be performed, such as through the requirement of a challenge, involving a second person to verify the authenticity of the login attempt, provide and require a one-time-password, among other examples. If this supplemental authentication step is validated (e.g., at 635), the login may be allowed to complete successfully (at 640). If the authentic user is detected to be near, but not at the location of the particular location designated by the proximity zone (i.e., outside the secure section proximity zone), and the supplemental authentication step cannot be validated (e.g., because an unauthorized user is the source of the login), then the security management system may again cause the login attempt to be denied (e.g., at 615). Further, if the authentic user is detected in a proximity zone representing collocation with the particular device (at 625), the login may also proceed successfully 640.

In some implementations, the determination of the location of a particular device used in an authentication attempt may take place prior to (or based on sensor data generated prior to) the detection of an authorized user associated with credentials used in the authentication attempt. For instance, a last detected location of the particular device may be identified from log data. When the determination of the location of the device and the authorized user are not perfectly contemporaneous, there exists the risk of a false negative being detected, particularly in the case of mobile computing devices, as the location of the device may have changed between the time the location was determined and the time the location of the authorized user is determined. In some implementations, a security management system may further include logic to consider a difference in time between the determination of the device location and the user location when determining whether a user is in a proximity environment corresponding to the device location (e.g., with larger time differences allowing for a larger divergence between the device's location and the measured user's location, as it is possible that the user has moved with the device in the intervening time difference). For instance, machine learning or a movement model may be applied to determine a radius in which a human user may have moved within a particular device within the span of time corresponding to the time difference. This radius may serve as a margin of error that may allow a divergent user location (vis-à-vis the location of the device) to nonetheless be determined as falling within a particular proximity zone (including a zone corresponding to the user's collocation with the device), among other examples.

Figure 7:
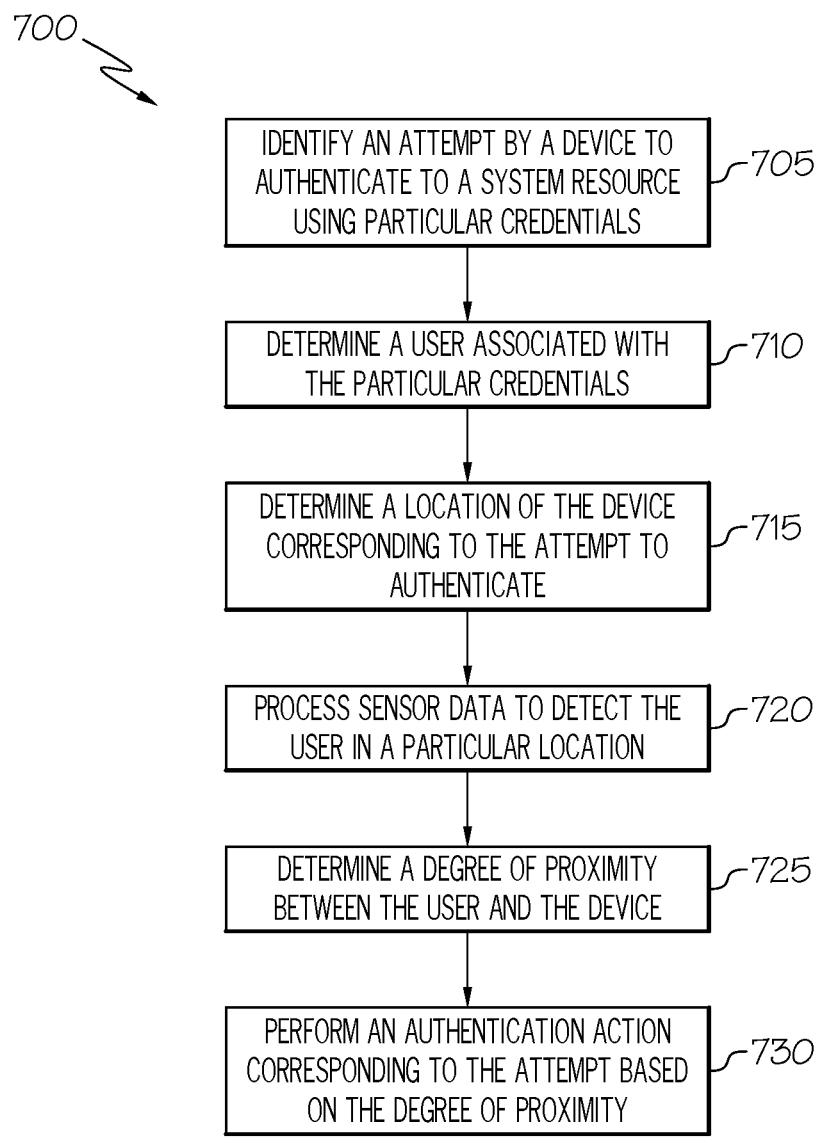

Turning to the flowchart 700 of FIG. 7, a technique involving an example security management system is illustrated. For instance, an attempt by a device to authenticate to one or more system resources may be identified 705 (e.g., intercepted or identified in a notification sent from the system that the device attempts to authenticate to, etc.). The authentication attempt may involve the use of particular credentials. A particular user may be determined 710 as associated with or bound to the credentials. The location of the device may be determined 715 based on, or in response to, the identified authentication attempt (e.g., based on a policy defined for securing the one or more system resources). Further, sensor data may be processed 720 (e.g., using machine learning or other techniques) to detect the particular user within an environment associated with the authentication attempt. A degree of proximity may be determined 725 between the location detected for the particular user and the location determined for the device. In some cases, the degree of proximity may be specified by proximity zone defined within an environment and indicating relative proximity to the location of the device (and corresponding to locations that suggest possible access to the device). An authentication action may be determined and performed 730 based on the determined degree of proximity between the detected location of the particular user and the location of the device used in the authentication attempt. For instance, the authentication action may involve approving the authentication attempt if the degree of proximity places the particular user at the location of the device. Other authentication actions, such as requiring additional authentication steps, may be defined for other degrees of proximity identifying a larger distance between the particular user and the device. Indeed, some degrees of proximity may indicate or imply that someone other than the authentic user is using the user's credentials in the authentication attempt illegitimately, and the authentication action may block the authentication attempt and trigger additional remedial actions that may be performed at the device, a host of the system resources, or on other devices (e.g., corresponding to the notification of other users or authorities to cause these persons to intervene), among other examples.

It should be appreciated that the flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as suited to the particular use contemplated.

The invention claimed is:

1. A method comprising:
    identifying an attempt to authenticate to a system resource using a particular device and particular credentials;
    determining an identity of a user associated with the particular credentials;
    determining, in association with the attempt to authenticate, a location associated with the particular device;
    accessing sensor data generated by a set of sensors deployed in ill an environment, wherein one or more of the set of sensors comprise sensors external to the particular device and at least some of the sensor data comprises biometric data generated by the sensors external to the particular device;
    determining a location of the user based on the biometric data;
    determining a degree of proximity between the location associated with the particular device and the location of the user; and
    triggering performance of an authentication action corresponding to the attempt to authenticate based on the degree of proximity and determining whether the location of the user exceeds a behavior deviation threshold according to heuristics or machine learning applied to a profile of the user.

2. The method of claim 1 wherein the set of sensors comprises a plurality of sensors and the location of the user is determined based on sensor data from the plurality of sensors.

3. The method of claim 2, wherein the plurality of sensors comprises sensors of different types.

4. The method of claim 1, wherein biometric data is generated from two or more of a camera sensor, voice sensor, card reader, fingerprint reader, and motion detector in the sensors external to the particular device.

5. The method of claim 1, wherein determining the location of the device comprises:
    determining an identifier of the device based on the attempt;
    accessing device data for the particular device; and
    determining from the device data that the particular device comprises a stationary workstation, wherein the location of the particular device is identified based on the device data.

6. The method of claim 1, wherein the particular device comprises a mobile computing device and determining the location of the particular device comprises:
    determining that the particular device is connected to a wireless network; and
    determining the location of the particular device based at least in part on identification of a location of a wireless access point used by the particular device to connect to the wireless network.

7. The method of claim 6, further comprising:
    tracking a change in location of the particular device;
    tracking location of the user; and
    determining whether the location of the user follows the change to the location of the particular device, wherein determining that the location of the user does not follow the change to the location of the particular device is to trigger a particular authentication action based on a security policy.

8. The method of claim 1, further comprising:
    determining a change in the location of the user;
    determining from the change in the location of the user that the user has departed from the particular device; and
    remotely causing access to the system resource by the particular device to be restricted automatically based on departure of the user.

9. The method of claim 1, wherein the degree of proximity identifies whether the user is in one of a plurality of proximity zones corresponding to the particular device, a first one of the plurality of proximity zones corresponds to collocation of the user with the particular device, a second one of the plurality of proximity zones comprises a proximity zone outside the first proximity zone and corresponding to location of the user within a geographical space associated with the particular device, and different authentication actions are defined for detecting the user in each respective one of the first and second proximity zones.

10. The method of claim 9, wherein the authentication action of the second proximity zone comprises generating a challenge for completion by the user at the particular device as a requirement for authentication, and the authentication action of the first proximity zone comprises allowing access to the system resource by the particular device in response to the attempt without completion of the challenge.

11. The method of claim 10, wherein the challenge comprises sending a one-time password to the user via another device associated with the user and presenting a prompt, on the particular device, for the one-time password as a prerequisite for accessing the system resource.

12. The method of claim 9, wherein the plurality of proximity zones comprises a third proximity zone corresponding to a physical premises in which the particular device is located, the third proximity zone is outside both the first and second proximity zones, and an authentication action of the third proximity zone comprises denying access to the system resource.

13. The method of claim 1, further comprising detecting, from the sensor data, another user in closer proximity to the particular device than the user, wherein the authentication action comprises denying access to the system resource and generating an alert for presentation to an administrator.

14. The method of claim 13, further comprising:
identifying historical location data for the other user; and
determining that location of the other user near the particular device is an anomaly based on the historical location data, wherein the alert is further based on the anomaly.

15. The method of claim 1, wherein the set of sensors are deployed in one or more fixed positions in the environment including at least one of a wall position, a floor position, and a ceiling position.

16. A non-transitory computer readable medium having program instructions stored therein, wherein the program instructions are executable by a computer system to perform operations comprising:
detecting a location of a particular computing device within an environment;
defining a plurality of proximity zones corresponding to the location of the particular computing device, wherein a first one of the plurality of proximity zones represents locations collocated with the location of the particular computing device and a second one of the plurality of proximity zones represents locations within a zone outside the first proximity zone;
detecting an authentication attempt using a set of credentials associated with a particular user;
determining a location of the particular user from sensor data generated by a plurality of sensors in the environment, wherein one or more of the plurality of sensors comprise sensors external to the particular computing device, the sensor data comprises biometric information generated by the sensors external to the particular device, and the location of the particular user is determined based at least in part on the biometric information;
determining that the location of the particular user is within one of the plurality of proximity zones;
determining a response to the authentication attempt based on which of the plurality of proximity zones is determined to contain the location of the particular user and determining whether the location of the particular user exceeds a behavior deviation threshold according to heuristics or machine learning applied to a profile of the particular user.

17. A system comprising:
a processor apparatus;
a memory element;
a premise security manager, executable by the processor apparatus to:
detect a location of a particular computing device within an environment;
define a plurality of proximity zones corresponding to the location of the particular computing device, wherein a first one of the plurality of proximity zones represents locations collocated with the location of the particular computing device and a second one of the plurality of proximity zones represents locations within a zone outside the first proximity zone;
detect an authentication attempt using a set of credentials associated with a particular user;
access sensor data generated by a plurality of sensors in the environment, wherein one or more of the plurality of sensors comprise sensors external to the particular device and the sensor data comprises biometric information generated by the sensors external to the particular device;
determining a location of the particular user based on the biometric information;
determine that the location of the particular user is within a particular one of the plurality of proximity zones;
determine a response to the authentication attempt based on the particular proximity zone containing the location of the particular user and determining whether the location of the particular user exceeds a behavior deviation threshold according to heuristics or machine learning applied to a profile of the particular user.

18. The system of claim 17, wherein the sensors external to the particular device comprise at least one of camera sensors or voice sensors.

19. The system of claim 17, further comprising a plurality of wireless access points, wherein the particular device comprises a mobile device and location of the particular device is based on a location of one of the plurality of wireless access points used by the particular device to access a network associated with the environment.

20. The system of claim 17, wherein the system resource comprises a software service hosted remote from the particular device.

* * * * *

UNITED STATES PATENT AND TRADEMARK OFFICE
CERTIFICATE OF CORRECTION

PATENT NO. : 10,686,793 B2
APPLICATION NO. : 15/610514
DATED : June 16, 2020
INVENTOR(S) : Vineet Verma Page 1 of 1

It is certified that error appears in the above-identified patent and that said Letters Patent is hereby corrected as shown below:

In the Claims

Column 19, Line 52 (Claim 1): "deployed in ill an environment," should read, --deployed in an environment,--.

Signed and Sealed this
Eighteenth Day of August, 2020

Andrei Iancu
*Director of the United States Patent and Trademark Office*